United States Patent [19]

Wulf et al.

[11] Patent Number: 4,819,155
[45] Date of Patent: Apr. 4, 1989

[54] APPARATUS FOR READING TO AND WRITING FROM MEMORY STREAMS OF DATA WHILE CONCURRENTLY EXECUTING A PLURALITY OF DATA PROCESSING OPERATIONS

[76] Inventors: William A. Wulf, 6052 Grafton St., Pittsburgh, Pa. 15206; Charles Y. Hitchcock, III, 7400 Penfield Ct., Pittsburgh, Pa. 15208

[21] Appl. No.: 56,789

[22] Filed: Jun. 1, 1987

[51] Int. Cl.$^4$ ............................................. G06F 9/38
[52] U.S. Cl. ............................................. 364/200
[58] Field of Search ...................... 364/200, 300, 900

[56] References Cited

U.S. PATENT DOCUMENTS

| | | | |
|---|---|---|---|
| 4,297,743 | 10/1981 | Appell et al. | 364/200 |
| 4,415,969 | 11/1983 | Bayliss et al. | 364/200 |
| 4,439,827 | 3/1984 | Wilkes | 364/200 |
| 4,574,348 | 3/1986 | Scallon | 364/200 |
| 4,719,570 | 1/1988 | Kawabe | 364/200 |

*Primary Examiner*—Raulfe B. Zache
*Attorney, Agent, or Firm*—Buchanan Ingersoll

[57] ABSTRACT

A pair of arithmetic logic units for receiving instruction to perform data transformations are positioned in tandem relation between an input bus and an output bus which are both connected to a register file. Data paths connect the register file to the input and output buses for transferring data from the register file to the arithmetic logic units. One arithmetic logic unit has a pair of input ports connected to the input bus and an output port connected to the input of the second arithmetic logic unit. The second arithmetic logic unit has a second input port connected to the input bus and an output port connected to the output bus. The tandem arrangement of arithmetic logic units are pipelined to operate concurrently to provide twice the data transformation capability of a single arithmetic logic unit in a data processor. With this arrangement streams of data are concurrently transformed by the tandem arrangement of arithmetic logic units to perform vector operations. With this arrangement control flow calculations are concurrently executed separately thus allowing the arithmetic logic units to compute data transformations at every moment. As a result procedure call parameters do not consume the general-purpose register since they are stored in a data value queue not saved or stored across procedure boundaries.

20 Claims, 3 Drawing Sheets

|  | Cycle 1 | Cycle 2 | Cycle 3 | Cycle 4 |
|---|---|---|---|---|
| Instruction X | INSTRUCTION DECODE OPERAND FETCH | ALU1 | ALU2 | OPERAND STORE |
| Instruction X+1 | | INSTRUCTION DECODE OPERAND FETCH | ALU1 | ALU2 |
| Instruction X+2 | | | INSTRUCTION DECODE OPERAND FETCH | ALU1 |
| Instruction X+3 | | | | INSTRUCTION DECODE OPERAND FETCH |

FIG. 3

APPARATUS FOR READING TO AND WRITING FROM MEMORY STREAMS OF DATA WHILE CONCURRENTLY EXECUTING A PLURALITY OF DATA PROCESSING OPERATIONS

BACKGROUND OF THE INVENTION

1. Field of the Invention

This invention relates to a data processor that includes a plurality of elements capable of performing concurrent data transformations, and more particularly, to a data processor that includes a tandem arrangement of arithmetic logic units connected by data buses to a register file whereby one unit receives two data items for transformation, while the other unit receives one data item from the register file and a second which is the result from the first unit for a second data transformation thereby permitting two data transformations to be calculated at once.

2. Description of the Prior Art

Known processors for digital computers typically provide a single arithmetic logic unit (ALU) to perform data transformations as well as memory address calculations for data operands and memory address calculations for control flow instructions. The conventional processors are also operable to pass parameter values across procedure boundaries by either storing them on a stack in memory or storing them in a general purpose register. With this arrangement either memory access time or general purpose register space is used.

The known processors typically use a central arithmetic logic unit to calculate the address of the next instruction assembled for execution. Conventionally, an instruction fetch unit (IFU) is utilized to pre-fetch instructions from memory in sequential order so that sequential instructions can be prepared to be issued rapidly. Some instructions specify the address of the next instruction to be executed which need not be the next sequential instruction, such as encountered with control flow instructions. Some control flow instructions may or may not be executed depending on the result of a prior instruction. These are known as conditional control flow instructions.

Most conventional data processors have many instructions which can set condition control flow instructions. In this regard the instruction that most recently sets the condition information prior to a conditional control flow instruction determines the next instruction to be performed. Commonly many instructions can be executed which set condition information that is never used. Also it is known that some processors have single instructions which specify both how to calculate condition information and a conditional control flow action. The conditional control flow action cannot be fully executed until the condition information is calculated by the same instruction.

Therefore, there is a need for a data processor that produces a conditional result followed by several instructions before a conditional control flow instruction. Further there is needed an instruction fetch unit that can detect the control flow instruction, receive a conditional result from the arithmetic logic units and fetch an instruction from a non-sequential location while the arithmetic logic units concurrently continue executing data transformations.

It is also known that only certain classes of algorithms can be fitted to vector instructions suitable for manipulation by a class of computers known as vector computers. It is often necessary to perform manipulations to make a computation "fit" the vector operations on such a computer. Many vector computers use finite-sized vector registers. Data sets must be broken up into segments of this size. Further with this arrangement, very recently computed values cannot be retrieved for the computation of "later" values.

Other machines use memory-to-memory vector operations in which case a similar "threshold", related to the write-to-memory/read-from-memory pipeline length exists. Not all vector operations can be performed on vector computers. In those instances where a value to be computed depends on the value just computed, the value is caught in a torrential current in a pipeline stage of several instructions.

For high level computer languages, such as Ada, vector computers experience difficulty with exception handling. The Ada language requires method exception handlers which are statistically nested within a subroutine.

Difficulty arises because there is no mechanism for inserting constraint checks into vector operations. Since machine checks (such as overflow) are generally not "raised" by the hardware until after the vector operation is complete, nonoptimal vector code must be generated.

Therefore there is need to provide data processing apparatus that performs vector functions without the necessity of incorporating additional hardware with a computer and permit the computer to execute recurrent loops in which a value to be computed depends on the value which was previously computed and which operation cannot be performed on a vector machine.

SUMMARY OF THE INVENTION

In accordance with the present invention there is provided apparatus for processing data that includes a register file for storage of data. Data paths connect the register file to an input bus and an output bus for transferring data to and from the register file. A first arithmetic logic unit has a pair of input ports connected to the input bus for receiving instructions to perform a data transformation and an output port. A second arithmetic logic unit has a pair of input ports for receiving instructions to perform a data transformation and an output port connected to the output bus. The second arithmetic logic unit input ports are connected to the first arithmetic logic unit output port and the input bus respectively. The second arithmetic logic unit performs a data transformation in response to input from the first arithmetic logic unit, while the first arithmetic logic unit is performing simultaneously a subsequent data transformation in response to input from the register file with a result being temporarily stored prior to transfer as input to the second arithmetic logic unit for data transformation in a subsequent cycle.

Further in accordance with the present invention there is provided apparatus for transferring a stream of data elements to and from the memory, of the computer that includes an a data processing unit for performing data transformations. A plurality of stream units are connected to the memory of the computer and the instruction unit for transferring a stream of data elements spaced a constant distance apart and originating from a starting address in the memory, between the memory and the processing unit. A first set of stream units transfer data elements as output to the memory. A second set of the stream units receive data elements as input from the memory. The first and second set of stream units supply and store spaced apart data elements to and from the data processing unit in response to commands from the data processing unit.

Additionally the present invention is directed to a method for fetching instructions from the memory of a computer for execution of data transformations by a data processor comprising the steps of pre-fetching instructions from the memory before the instructions are needed for performing data transformations by the data processor. Pre-fetched instructions corresponding to conditional control flow instructions are stored. Data transformations are performed concurrently while the pre-fetched instructions are stored. Conditional control data are generated by the data transformations and the data are stored in a condition queue. The stored conditional control data are fetched by an instruction fetch unit for execution of conditional control instructions. Thereafter, non-conditional control flow instructions for execution by the data processor are substituted at any cycle of operation.

Additionally, the present invention is further directed to a method for storing procedure call parameter values in a value queue comprising the steps of connecting an execution unit to a value queue to receive and transfer procedure call parameter values from and to the value queue respectively. The procedure call parameters values are received from the execution unit in a register file. Thereafter the procedure call parameter values are maintained in the order they are received in the register as the values are transferred to the execution unit for data transformation. Stored procedure call parameter values are provided in the order stored when requested by the instruction for data transformation.

Accordingly the principal object of the present invention is to provide in a data processor a tandem arrangement of arithmetic logic units for concurrent operation in which two operand data manipulations are calculated simultaneously.

A further object of the present invention is to provide processing elements for calculating memory addresses of a series of data operands where the calculations are concurrent with data transformations performed by a tandem arrangement of arithmetic logic units.

An additional object of the present invention is to provide a processing element that identifies control flow instructions prior to execution by a tandem arrangement of arithmetic logic units so that the address of the next instruction is calculated and fetched from memory concurrent with other data transformations being performed by the tandem arithmetic logic units.

A further object of the present invention is to provide a means of parameter passing that involves neither memory access times nor general-purpose register spaces.

These and other objects of the present invention will be more completely disclosed and described in the following specification, the accompanying drawings, and the appended claims.

BRIEF DESCRIPTION OF THE DRAWINGS

FIG. 3 is a chart illustrating overlapping of instruction executions of arithmetic logic units.

DESCRIPTION OF THE PREFERRED EMBODIMENTS

Figure 1:
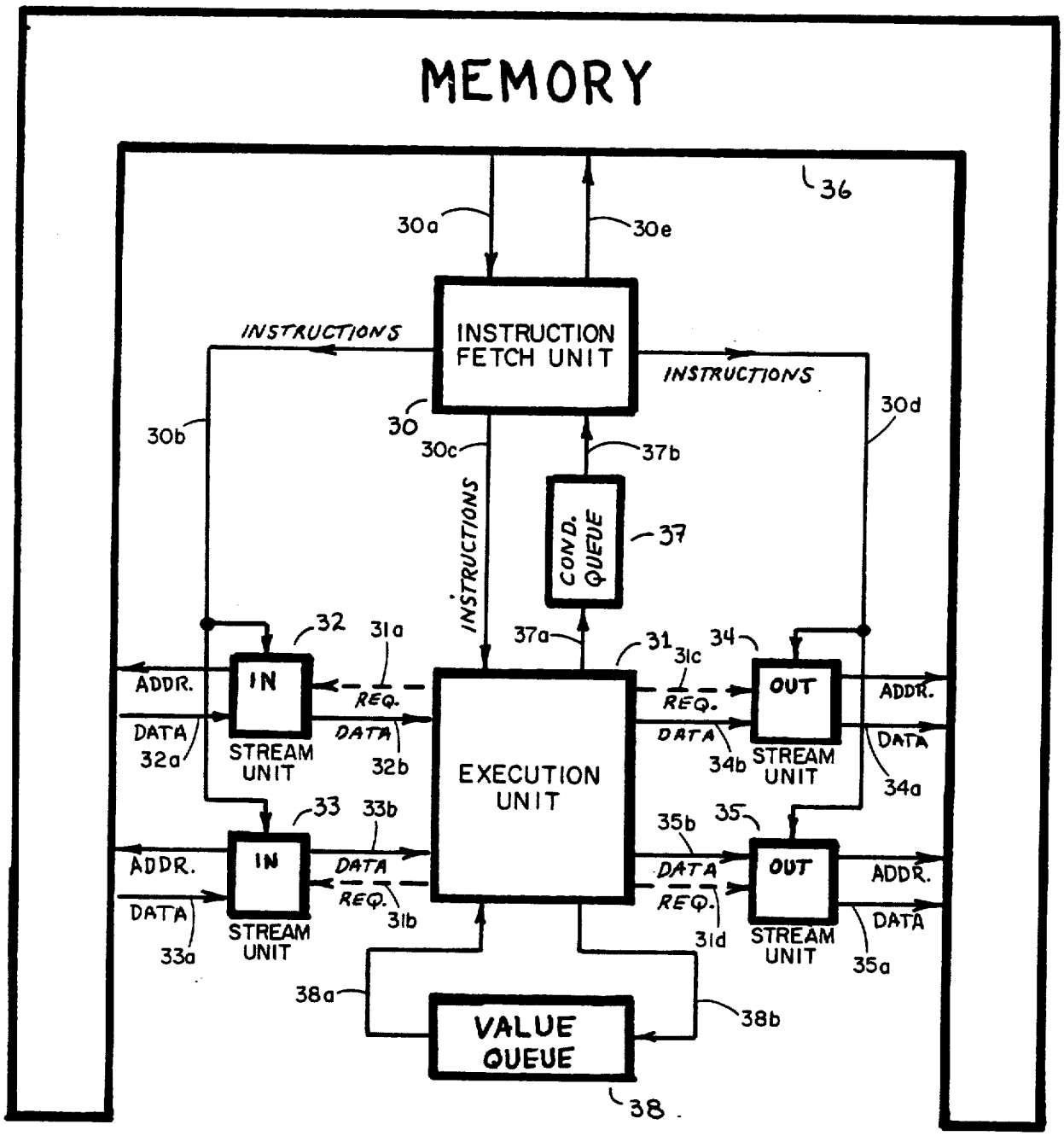
FIG. 1 is a diagrammatic illustration of a data processor in accordance with the present invention.

Referring to the drawings, and particularly to FIG. 1, there is illustrated a data processor which provides improved data processing performance by increasing concurrent data transformations. The data processor includes an execution unit (EU) which is shown in greater detail in FIG. 2 in which register file 10 is connected to an input bus 11 by data path 11a. The input bus 11 is connected to an arithmetic logic unit (ALU) 13 by data paths 11b and 11c. The input bus 11 is connected to an arithmetic logic unit (ALU) 14 by data path 11d. The input bus 11 and data paths 11a, 11b, 11c, and 11d function to transfer data from the register file 10 to ALU 13 and ALU 14. ALU 13 is connected to ALU 14 by data path 13a. ALU 14 is connected to an output bus 12 by data path 12a. The output bus 12 is connected to the register file 10 by data path 12b. The output bus 12 and data paths 12a and 12b function to transfer data from ALU 14 to the register file 10.

The register file 10 is connected by control path 15a to the instruction fetch unit (IFU) 30. ALU 13 is connected by control path 15b to the IFU 30. ALU 14 is connected by control path 15c to IFU 30. Control paths 15a, 15b, and 15c shown in FIG. 2 correspond to control path 30c shown in FIG. 1. Control paths 15a, 15b, and 15c are operable to transfer instructions from the IFU 30 to the register file 10, ALU 13, and ALU 14.

As known in the art, an operand is a data element upon which a calculation is performed. For example, in the expression $A = B + C$, B and C represent the operands upon which an addition calculation is performed. Calculations are performed on operands by ALU 13 and ALU 14 of the present invention. ALU 13 receives two operands from the register file 10 through the input bus 11. ALU 14 receives an operand from the register file 10 through the input bus 11, and an operand from the output of ALU 13 through data path 13a. The connection between ALU 13 and ALU 14 in this manner is known as a tandem connection.

Connecting ALU 13 and ALU 14 in tandem implements the evaluation of an instruction of the form $$S0 := (S1 \; op1 \; S2) \; op2 \; S3$$

where S0, S1, and S3 specify values kept in the register file 10 or values themselves. "op1" and "op2" specify data transformations such as "add" or "multiply", that can be performed by ALU 13 and ALU 14.

ALU 13 and ALU 14 perform a data transformation in a fixed amount of time called a "cycle". During each cycle execution unit (EU) 31 shown in FIG. 1 issues and executes an instruction in a pipelined fashion. Pipelining refers to the execution of computations which are in various stages of completion. Now referring to FIG. 3, there is illustrated by the row designated instruction x an instruction which is executed in a pipelined fashion. In cycle 1, the instruction is decoded, two operands are transferred to ALU 13, and one operand is transferred to ALU 14. The operands are transferred to ALU 13 and ALU 14 from the register file 10 by the input bus 11. In cycle 2, the first part of the expression, S1 S1 op1 S2, is evaluated by ALU 13. In cycle 3, the result of the evolution by ALU 13 in cycle 2, designated for this example as R, is transferred to ALU 14 by data path 13a. The second part of the expression, R op2 S3 is then evaluated by ALU 14. In cycle 4, the result of the data transformation is transferred to the register file 10 by the output bus 12.

Connecting ALU 13 and ALU 14 in tandem makes it possible to concurrently process several instructions by overlapping pipeline stages. As shown in FIG. 3, overlapping of pipeline stages of several instructions is illustrated by the rows designated instruction x+1, instruction x+2, and instruction x+3. During cycle 1 the instruction x is decoded and operands are fetched. In cycle 2, the first part of instruction x is evaluated by ALU 13, and the instruction x+1 is decoded and operands are fetched. During cycle 3, the second part of instruction x is evaluated by ALU 14. The first part of the instruction x+1 is evaluated by ALU 13. Instruction x+2 is decoded and operands are fetched. During cycle 4, the result of instruction x is stored. The second part of instruction x+1 is evaluated by ALU 14. The first part of instruction x+2 is evaluated by ALU 13. Instruction x+3 is decoded, and operands are fetched.

Figure 2:
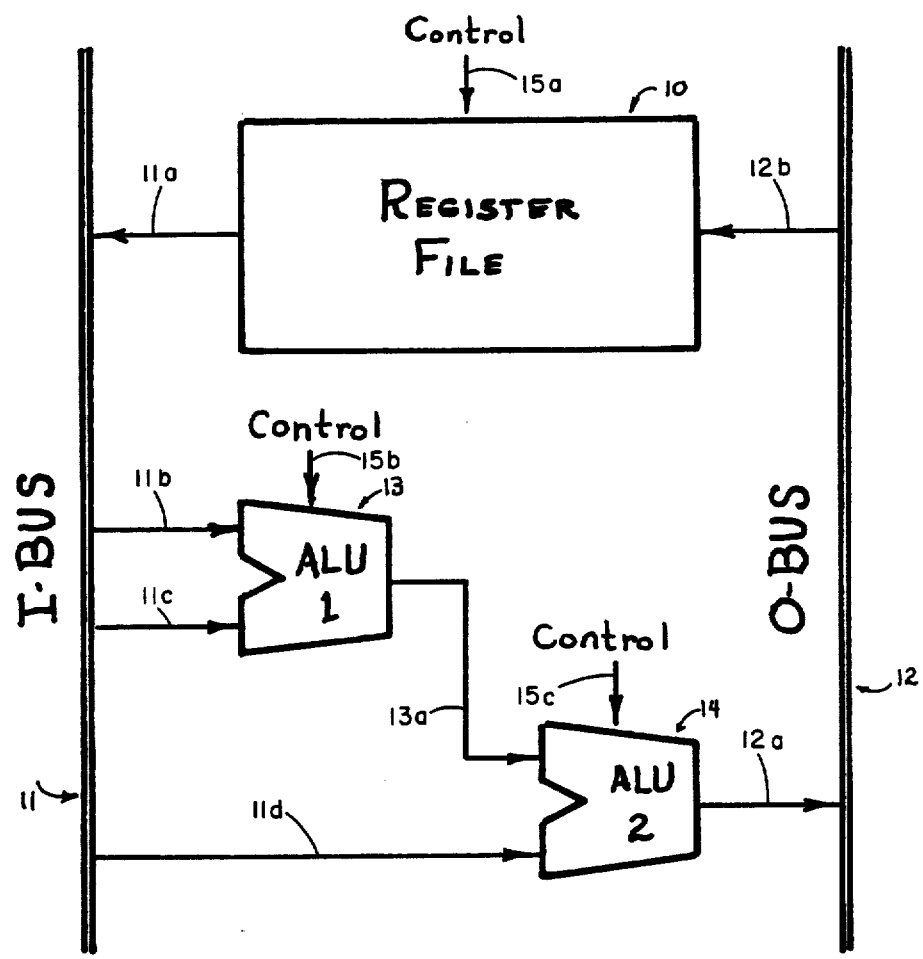
FIG. 2 is a schematic illustration of the execution unit shown in FIG. 1.

The interaction between the processing units of the data processor 31 is shown in FIG. 1. An instruction fetch unit (IFU) 30 is connected to memory 36 by data path 30a and data path 30e. The IFU 30 is operable to fetch from memory 36 the instructions that describe the data transformations to be performed by the EU 31, and the operations to be performed by the input stream unit SU 32 and input SU 33, and the output stream unit SU 34 and output SU 35. The IFU 30 is connected to the EU 31 by control path 30c. Control path 30c is a general designation for control paths 15a, 15b, and 15c as shown in FIG. 2. The IFU 30 is connected to input SU 32 and SU 33 by control path 30b. The IFU is connected to output SU 34 and SU 35 by control path 30d.

As conventionally known, an IFU is operable to pre-fetch instructions from memory in sequential order for rapid transmission of sequential instructions. Pre-fetching refers to accessing instructions from memory before they are needed and storing them for future execution. This reduces the effect of a long memory access latency. Although sequential instructions are commonly pre-fetched, memory address calculations for control flow instructions are typically performed by the ALU. Control flow instructions are those which specify that the address of the next instruction to be executed is not the next sequential instruction. For example, an instruction to jump to another program line and an instruction to call a subroutine are control flow instructions.

The IFU 30 is operable to identify control flow instructions prior to their execution by ALU 13 and ALU 14 and calculate the address of the next instruction to be executed. The instruction is then fetched from memory 36 concurrently with data transformations being performed by the EU 31. Additionally, conditional control flow instructions are executed in the IFU 30. Conditional control flow instructions are those which specify that the address of the next instruction to be executed depends on the result of an EU 31 operation. An example of a conditional control flow instruction is If a=b+c
   go to 1000
else
   go to 2000 where the address of the next instruction to be executed depends on the result of the addition operation.

When condition information is generated by instructions executed by the EU 31 the information is stored in the condition queue 37 which is connected to the EU 31 by data path 37a. A queue is a first-in first-out (FIFO) data structure. The IFU 30 is connected to the condition queue 37 by data path 37b. It receives values from the condition queue 37 whenever a conditional control flow instruction is encountered. Queuing condition information for use by the IFU 30 allows the IFU 30 to issue non-conditional control flow instructions every cycle for execution by the EU 31. Cycles are not wasted waiting for condition information to e generated which is needed to determine the address of the next instruction to be executed. This approach to conditional jumps allows such operations to take no execution time.

The improved method of processing conditional control flow instructions can be illustrated by an examination of the overlapped pipeline stages of instruction execution shown in FIG. 3. A non control-flow instruction has four pipeline stages such that it takes four cycles to execute. If an instruction is a conditional control flow instruction, the address of the next instruction to be executed cannot be determined until the several cycles needed to generate the conditional control datum have elapsed. With the present invention, however, while such an instruction is executing in the execution unit pipeline, other non-control flow instructions may also be executing. Once conditional control flow data has been generated, it may be used in the instruction fetch unit to concurrently determine the address of the next instruction to be executed.

The input SU 32 is connected to memory 36 by data path 32a and to the EU 31 by data path 32b. The input SU 33 is connected to memory 36 by data path 33a and to the EU 31 by data path 33b. SU 32 and SU 33 are operable to transfer streams of data from memory 36 to the register file 10 in the EU 31. The output SU 34 is connected to memory 36 by data path 34a and to the EU 31 by data path 34b. The output SU 35 is connected to memory 36 by data path 35a and to the EU 31 by data path 35b. SU 34 and SU 35 are operable to transfer streams of data from the register file 10 in the EU 31 to memory 36.

A stream of data is a series of data elements in memory that start at a known address, are the same size and type, and are spaced a constant distance apart. The constant distance between the data elements is known as a stride. High-level computer program languages, such as Ada, are operable to perform data transformations on a series of data. For example, a list of numbers is to be summed. The list is represented in contiguous memory as an array where each data element is spaced at a specific stride.

SU 32, SU 33, SU 34, and SU 35 transfer streams of data without having to perform explicit address computations. At the start of a stream operation, the SU 32, 33, 34, and 35 receive a starting address from the EU 31 or IFU 30. This describes the location in memory 36 of the first stream element. The SU 32, 33, 34, and 35 also receive a stride which indicates the distance in memory 36 between the elements of the stream. In this manner, the SU 32, 33, 34, and 35 supply or store an operand to or from the EU 31 whenever requested by the EU 31 through request paths 31a, 31b, 31c, and 31d. Methods for stopping a stream operation include specifying an ending address, specifying the number of stream elements to be processed, or by an explicit instruction. It should also be understood in accordance with the present invention that although two input stream units and two output stream units are depicted, any number may be used.

Streaming provides functionality and performance similar to that of high speed "vector" architectures. In accordance with the present invention vector functions are performed without additional hardware, and recurrent loops which cannot be vectorized are processed. Recurrent loops are those in which a value to be computed depends on the value which was previously computed. The following loop is an example of a recurrent loop:

```
FOR i in 1 ... 1000 LOOP
    a(i)=a(i-1)*2
END LOOP
```

In pipelined machines which vectorize, the previous value is caught in the pipeline and unable to be accessed for use in the subsequent computation. This example can be streamed, however, by providing an additional instruction to hold the array element from the previous iteration. Streaming is also useful for string processing, sorting, and decimal arithmetic.

The EU 31 is connected to a value queue 38 (FIFO) by data path 38a and data path 38b. The EU 31 receives or transfers procedure call parameter values from or to the value queue. Procedure calls are a type of control flow instruction which transfer control and subsequently return to the point of transfer. Procedure call parameters are operands which are transferred along with control. By providing a mechanism for storing parameters, the value queue 38 functions to reserve the use of the register file 10 for data transformations and eliminate memory access operations. The value queue 38 is referenced by programmed instructions sent to the EU 31. Reference may be by an explicit queue manipulation instruction or by a register name that is aliased to refer to the value queue 38. Other types of control flow instructions do not manipulate the value queue 38.

An invention with two tandem arithmetic logic units pipelined to operate concurrently provides twice the data transformation capability of a single ALU data processor by allowing two operand data manipulations to be calculated at once. Data transformation capability is increased further by the ability to read to and write from memory streams of data while concurrently performing basic data transformations, and by providing a facility for performing conditional and unconditional control flow operations concurrently with basic data transformations. A method for storing procedure call parameters in a value queue saves memory access time and reserves the general purpose registers for use in basic data transformations.

According to the provision of the patent statutes, we have explained the principle, preferred instruction and mode of operation of our invention and have illustrated and described what we now consider to represent its best embodiment. However, it should be understood that, within the scope of the appended claims, the invention may be practiced otherwise than as specifically illustrated and described.

We claim:

1. Apparatus for processing data comprising,
a register file for storage of data,
an input bus and an output bus,
data paths connecting said register file to said input and output buses for transferring data to and from said register file,
a first arithmetic logic unit having a pair of input ports connected to said input bus for receiving instruction to perform a data transformation and an output port,
a second arithmetic logic unit having a pair of input ports for receiving instruction to perform a data transformation and an output port connected to said output bus,
said second arithmetic logic unit input port being connected to said first arithmetic logic unit output port and said input bus respectively, and
said second arithmetic logic unit performing a data transformation in response to input from said first arithmetic logic unit while said first arithmetic logic unit is performing simultaneously a subsequent data transformation in response to said input from said register file with a result being temporarily stored prior to transfer as input to said second arithmetic logic unit for data transformation in a subsequent cycle.

2. Apparatus as set forth in claim 1 which includes,
an instruction fetch unit, and
a control path for connecting said instruction fetch unit to said register file for transferring instructions thereto.

3. Apparatus as set forth in claim 2 which includes,
a plurality of control paths for connecting said instruction fetch unit to said first and second arithmetic logic units respectively.

4. Apparatus as set forth in claim 1 which includes,
means for connecting said first arithmetic unit to said second arithmetic unit in tandem relation to perform the instruction $$S0:=(S1\ op1\ S2)\ op2\ S3$$

where S1, S2 and S3 specify values maintained in said register file, op1 and op2 specify data transformations, and S0 specifies the register in said register file to which the result of said data transformations is returned.

5. Apparatus as set forth in claim 1 wherein,
said first and second arithmetic units perform data transformations in cycles of fixed units of time.

6. Apparatus for transferring a stream of data elements to and from a computer memory comprising,
a data processing unit for performing data transformations,
a plurality of stream units connected to the computer memory and said data processing unit for transferring a stream of data elements spaced a constant distance apart and originating from a starting address in the computer memory between the computer memory and said data processing unit,
a first set of stream units transferring data elements as output to the computer memory,
a second set of said stream units receiving data elements as input from the computer memory, and
said first and second set of stream units supplying and storing said spaced apart data elements to and from said data processing unit in response to commands from said data processing unit.

7. Apparatus as set forth in claim 6 in which,
said data processing unit includes a register file,
a data path for connecting said first set of stream units to the computer memory, and
said first set of stream units transferring streams of data from the computer memory to said register file.

8. Apparatus as set forth in claim 6 in which,
said data processing unit includes a register file,
a data path for connecting said second set of stream units to the computer memory, and
said second set of stream units transferring streams of data from said register to the computer memory.

9. Apparatus as set forth in claim 6 which includes,
said starting address located in said data processing unit for initially transmitting streams of said data elements to said first and second sets of streams units where said streams of data are transferred in strides, and
said strides being spaced a constant distance apart.

10. Aparatus as set forth in claim 9 which includes,
data transformations being performed in contiguous memory as an array where each data element is spaced at a specific one of said strides.

11. A method for fetching instructions from computer memory for execution of data transformations by a data processor comprising the steps of,
pre-fetching instructions from the computer memory before the instructions are needed for performing data transformation by the data processor,
storing pre-fetched instructions corresponding to conditional control flow instructions,
concurrently performing data transformations while the pre-fetched instructions are stored,
generating conditional control data by the data transformations and storing said data in a conditional queue,
fetching the stored conditional control data by an instruction fetch unit for execution of conditional control instructions, and
therefore substituting non-conditional control flow instructions for execution by the data processor at any cycle of operation.

12. A method as set forth in claim 11 which includes,
concurrently performing data transformations in an execution unit while executing conditional control instructions by the instruction fetch unit.

13. A method as set forth in claim 11 which includes,
the instruction fetch unit receiving conditional control instructions concurrently with the execution of other instructions.

14. A method as set forth in claim 11 which includes,
allowing the instruction fetch unit to operate only on non-conditional control flow instructions.

15. A method as set forth in claim 11 which includes,
identifying control flow instructions prior to execution and calculating the address of the next instruction to be executed.

16. A method for storing procedure call parameter values in a value queue comprising the steps of,
connecting an execution unit to a value queue to receive and transfer procedure call parameters from and to the value queue respectively,
receiving the procedure call parameter values from the execution unit in a register file,
thereafter maintaining the procedure call parameter values stored in a preselected order as they are received in the register file as the values are transferred to the execution unit for data transformation, and
providing stored procedure call parameter values in the order stored when requested by instruction for data transformation.

17. A method as set forth in claim 16 which includes,
connecting the execution unit by a data path to the value queue.

18. A method as set forth in claim 16 which includes,
storing procedure call parameters to reserve use of the register file for data transformations and eliminate memory access operations.

19. A method as set forth in claim 16 which includes,
making reference to the value queue by programmed instructions.

20. A method as set forth in claim 16 which includes,
making reference to the value queue by a register name aliased to refer to the value queue.

* * * * *

UNITED STATES PATENT AND TRADEMARK OFFICE
CERTIFICATE OF CORRECTION

PATENT NO. : 4,819,155
DATED : April 4, 1989
INVENTOR(S) : WILLIAM A. WULF, CHARLES Y. HITCHCOCK, III It is certified that error appears in the above-identified patent and that said Letters Patent is hereby corrected as shown below:

Column 2, line 61, after "an" insert --instruction unit and--.

Column 4, line 61, delete the second occurrence of "S1".

Column 6, line 7, change "e" to --be--.

Signed and Sealed this

Seventeenth Day of October, 1989

Attest:

DONALD J. QUIGG

Attesting Officer

Commissioner of Patents and Trademarks